(12) United States Patent
Morton et al.

(10) Patent No.: US 10,366,027 B2
(45) Date of Patent: Jul. 30, 2019

(54) I/O WRITES WITH CACHE STEERING

(71) Applicants: ADVANCED MICRO DEVICES, INC., Santa Clara, CA (US); ATI TECHNOLOGIES ULC, Markham (CA)

(72) Inventors: Eric Christopher Morton, Austin, TX (US); Elizabeth Cooper, Sunnyvale, CA (US); William L. Walker, Fort Collins, CO (US); Douglas Benson Hunt, Fort Collins, CO (US); Richard Martin Born, Fort Collins, CO (US); Richard H. Lee, Sunnyvale, CA (US); Paul C. Miranda, Austin, TX (US); Philip Ng, Markham (CA); Paul Moyer, Fort Collins, CO (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/826,065

(22) Filed: Nov. 29, 2017

(65) Prior Publication Data
US 2019/0163656 A1    May 30, 2019

(51) Int. Cl.
*G06F 13/28* (2006.01)
*G06F 12/0815* (2016.01)
(Continued)

(52) U.S. Cl.
CPC .......... *G06F 13/28* (2013.01); *G06F 12/0815* (2013.01); *G06F 12/0862* (2013.01); *G06F 12/0891* (2013.01); *G06F 12/0893* (2013.01)

(58) Field of Classification Search
CPC ............. G06F 12/0815; G06F 12/0862; G06F 12/0891; G06F 12/0893; G06F 12/0808; G06F 13/28
See application file for complete search history.

(56) References Cited

U.S. PATENT DOCUMENTS

| 6,490,658 B1 * | 12/2002 | Ahmed ................. G06F 9/3455 711/137 |
| 2002/0129211 A1 * | 9/2002 | Arimilli .............. G06F 12/0831 711/146 |

(Continued)

OTHER PUBLICATIONS

"Achieving Fast, Scalable I/O for Virtualized Servers", White Papers for Intel Ethernet, https://www.intel.com/content/dam/www/public/us/en/documents/white-papers/scalable-i-o-virtualized-servers-paper.pdf, 4 pages, accessed Nov. 28, 2017.

(Continued)

*Primary Examiner* — Glenn A. Auve

(57) ABSTRACT

A method for steering data for an I/O write operation includes, in response to receiving the I/O write operation, identifying, at an interconnect fabric, a cache of one of a plurality of compute complexes as a target cache for steering the data based on at least one of: a software-provided steering indicator, a steering configuration implemented at boot initialization, and coherency information for a cacheline associated with the data. The method further includes directing, via the interconnect fabric, the identified target cache to cache the data from the I/O write operation. The data is temporarily buffered at the interconnect fabric, and if the target cache attempts to fetch the data while the data is still buffered at the interconnect fabric, the interconnect fabric provides a copy of the buffered data in response to the fetch operation instead of initiating a memory access operation to obtain the data from memory.

25 Claims, 4 Drawing Sheets

(51) Int. Cl.
  *G06F 12/0862* (2016.01)
  *G06F 12/0891* (2016.01)
  *G06F 12/0893* (2016.01)

(56) References Cited

U.S. PATENT DOCUMENTS

| | | | |
|---|---|---|---|
| 2006/0085602 A1 | 4/2006 | Huggahalli et al. | |
| 2006/0123195 A1 | 6/2006 | Mukherjee | |
| 2009/0006668 A1 | 1/2009 | Vasudevan et al. | |
| 2009/0157977 A1 | 6/2009 | Gregg et al. | |
| 2013/0111149 A1* | 5/2013 | Moll | G06F 12/0815 711/141 |
| 2015/0006783 A1 | 1/2015 | Chew | |
| 2015/0227312 A1* | 8/2015 | Feehrer | G06F 3/061 710/22 |
| 2016/0062890 A1* | 3/2016 | Salisbury | G06F 12/0815 711/146 |
| 2016/0371222 A1* | 12/2016 | Yifrach | G06F 12/1441 |
| 2017/0091108 A1 | 3/2017 | Arellano et al. | |
| 2018/0267741 A1* | 9/2018 | Blake | G06F 3/0604 |

OTHER PUBLICATIONS

Website—"Data Direct I/O (DDIO): Advancing System I/O Performance", LPC 2012, https://www.intel.com/content/dam/www/public/us/en/documents/white-papers/scalable-i-o-virtualized-servers-paper.pdf, Linux Plumbers Conference, Aug. 29-31, 2012, San Diego, California.

"Intel Data Direct I/O Technology Overview", Techology Overview, https://www.intel.com/content/dam/www/public/us/en/documents/white-papers/data-direct-i-o-technology-overview-paper.pdf, 4 pages, accessed Nov. 28, 2017.

"Intel Data Direct I/O Technology (INTEL DDIO): A Primer" Intel Technical Brief, Feb. 2012, https://www.intel.com/content/dam/www/public/us/en/documents/technology-briefs/data-direct-i-o-technology-brief.pdf, 11 pages, accessed Nov. 28, 2017.

"TLP Processing Hints" PCI-SIG Engineering Change Notice, Sep. 8, 2011, https://pcisig.com/sites/default/files/specification_documents/ECN_TPH_11Sept08.pdf, 16 pages.

International Search Report and Written Opinion dated Dec. 10, 2018 for corresponding International Application No. PCT/US2018/048187, 12 pages.

* cited by examiner

I/O WRITES WITH CACHE STEERING

BACKGROUND

Processing systems often utilize a direct memory access (DMA) process to allow input/output (I/O) devices to access system memory substantially independent of the processing cores of the system. In a conventional read operation from an I/O device using DMA, the I/O device is instructed, for example by a device driver, to perform a memory access operation to transfer a copy of the I/O data from the I/O device to system memory. A processing core then may subsequently utilize the I/O data by performing another memory access operation to access the data from the system memory and cache the I/O data at a cache hierarchy accessible by the processing unit. As such, each read operation from an I/O device involves at least two high-latency memory access operations before the subject data is available for use by a processing core. Moreover, some processing systems utilize dual data rate (DDR) dynamic random access memory (DRAM) or another memory architecture in which the memory bus is limited to either a read operation or a write operation at any given time (that is, cannot perform both a read operation and a write operation concurrently), and thus the two memory access operations used to make I/O data available to a processing unit in a conventional system impacts the memory subsystem's availability to handle memory access operations for other requesters.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
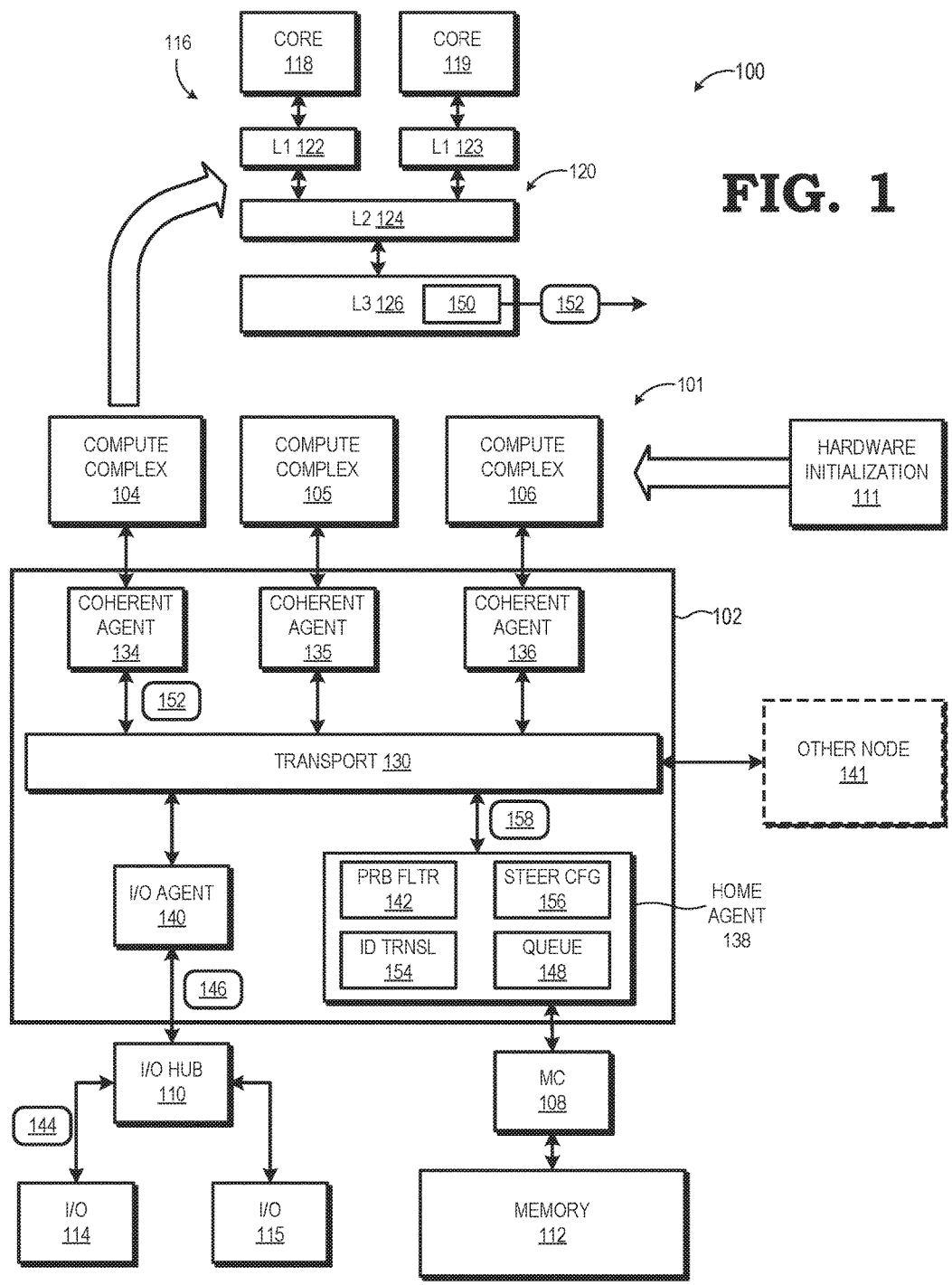
FIG. 1 is a block diagram of a processing system utilizing steered I/O write operations in accordance with some embodiments.

For a conventional read operation for an I/O device, data provided by an I/O device for use by a compute complex is first stored to a system memory, and then subsequently accessed from the system memory and stored at a cache of the compute complex for use. In contrast, as described herein, such read-from-I/O operations may be implemented as a "steered" DMA access such that the data associated with the operation (the "I/O data") is buffered at an interconnect fabric connecting the I/O device to one or more compute complexes and one or more system memories. The interconnect fabric identifies a cache of one of the compute complexes to "steer" the I/O data to, and directs this cache (referred to herein as the "target cache") to fetch the cacheline associated with the I/O data. In response, the target cache schedules its prefetcher to fetch the cacheline. Assuming the prefetcher initiates the fetch operation before the interconnect fabric has to evict the buffered I/O data to system memory, the interconnect fabric can satisfy the fetch operation by providing the buffered copy of the I/O data to the prefetcher, and thus avoiding the need to initiate a memory access operation to access the I/O data from system memory for the prefetcher. The prefetcher receives and caches this buffered copy of the I/O data, thereby making it available to the associated compute complex while eliminating at least one of the memory access operations that otherwise would be required for a compute complex to access data from an I/O device in a conventional manner. As the I/O data read from the I/O device is "written" to the system memory (or appears as such) from the perspective of the compute complex, such operations are referred to as "I/O write operations" or "I/O writes", which is the naming convention utilized herein.

The interconnect fabric identifies the target cache using any of a variety of techniques or combinations thereof. In some embodiments, a device driver or other software executing at the processing system may provide a steering indicator in association with the I/O write that indicates an intended steering target, which may be generally a specified compute complex or, more particularly, a specific cache within a specified compute complex. The interconnect fabric thus may use this indicator to identify the target cache to which the I/O data is to be steered. In other embodiments, basic input output system (BIOS), Unified Extensible Firmware Interface (UEFI), or another hardware initialization component configures the interconnect fabric with steering configuration data that specifies that certain I/O write operations for a specified bus, device, or function are to be steered to a particular cache or particular compute complex, and the interconnect fabric thus steers I/O data for such I/O write operations accordingly. In yet other embodiments, the processing system includes a probe filter that maintains coherency information for cachelines accessed for the compute complexes, and the interconnect fabric accesses the probe filter to obtain the coherency information for the cacheline associated with the I/O data, and from this coherency information determines the current "owner" of the cacheline, and so identifies this current "owner" as the target cache.

FIG. 1 illustrates a processing system 100 implementing steered I/O write operations in accordance with at least some embodiments. The processing system 100 includes a node 101 having an interconnect fabric 102 used to interconnect various components of the node 101, including a plurality of compute complexes, such as compute complexes 104, 105, and 106, one or more memory controllers (MC) 108, and one or more I/O hubs 110. Each memory controller 108 in turn is coupled to a system memory 112, and each I/O hub 110 is in turn coupled to one or more I/O devices, such as I/O devices 114, 115. The processing system 100 further may include one or more hardware initialization components 111, such as a Basic Input Output System (BIOS) or Unified Extensible Firmware Interface (UEFI), used to initialize various components of the node 101 during a boot initialization process.

As shown by expanded view 116, each compute complex includes one or more processor cores, such as the two processor cores 118, 119, and a local cache hierarchy 120. The processor cores include, for example, central processing unit (CPU) cores, graphics processing unit (GPU) cores, digital signal processor (DSP) cores, or a combination thereof. It will be appreciated that the number of processor cores of the compute complex may be fewer or more than the depicted two processor cores. The local cache hierarchy 120 of a compute complex includes one or more levels of cache. In the illustrated embodiment, the local cache hierarchy 120 includes two level 1 (L1) caches 122, 123, a level 2 (L2) cache 124, and a level 3 (L3) cache 126. The L1 caches 122, 123 are private to the corresponding processor core, whereas the L2 cache 124 and L3 cache 126 are shared among the processor cores and L1 caches of the compute complex.

The memory controller 108 operates as the interface between the corresponding system memory 112 and the other components of the node 101, and in particular the local cache hierarchies 120 of the compute complexes and the I/O devices 114, 115. Thus, data to be cached in a local cache hierarchy 120 typically is manipulated as blocks of data referred to as "cachelines", and which are addressed or otherwise located in a memory hierarchy using a physical address of system memory 112. Cachelines are accessed from the system memory 112 by the memory controller 108 in response to access requests from a local cache hierarchy 120, and the cachelines are installed, or cached, in one or more caches of the local cache hierarchy 120. Likewise, when a cacheline containing modified data is evicted from a local cache hierarchy 120, and thus needs to be updated in the system memory 112, the memory controller 108 manages this write-back process.

The I/O devices 114, 115 operate to transfer data into and out of the node 101 using DMA access operations. For example, one of the I/O devices 114, 115 can include a network interface card (NIC) for connecting the node to a network for receiving and transmitting data, or hard disk drive (HDD) or other mass storage device for non-volatile storage of relatively large quantities of data for use by the compute complexes 104, 105, and 106, and the like. In at least one embodiment, the I/O hub 110 manages the I/O devices 114, 115 and serves as an interface between the interconnect fabric 102 and the I/O devices 114, 115. To illustrate, in one embodiment the I/O hub 110 includes a Peripheral Component Interconnect Express (PCIe) root complex so as to operate as a PCIe interconnect between the I/O devices 114, 115 and the interconnect fabric 102.

The interconnect fabric 102 includes a transport layer 130 and a plurality of coherent agents that operate as the interfaces between the transport layer 130 and the other components of the node 101. As such, in the illustrated embodiment these coherent agents include coherent agents 134, 135, and 136 as interfaces for the compute complexes 104, 105, and 106, respectively, a coherent agent 138 (also referred to herein as "home agent 138") for the memory controller 108/system memory 112, and a coherent agent 140 (also referred to herein as "I/O agent 140") for the I/O hub 110 and I/O devices 114, 115. Further, in some embodiments, the transport layer 130 is coupled to the corresponding transport layer of one or more other nodes 141 via a bridge component (not shown). The interconnect fabric 102 may be compatible with one or more standardized interconnect specifications, such as a HyperTransport™ specification or an Infinity Fabric™ specification.

As a general operational overview, the interconnect fabric 102 operates to transport commands, data, and other signaling among the other components of the node 101, and between node 101 and other nodes 141. One such subset of these transport operations is the storage of data provided by the I/O devices 114, 115 for use by one or both of the compute complexes 104, 105. In a conventional system, an I/O device would use a DMA operation to store data from the I/O device in the system memory, and then signal the corresponding compute complex that the data was available in system memory via an interrupt or other signal. The compute complex would then access the data from the system memory. However, this process requires two memory access operations. Accordingly, in at least one embodiment, the home agent 138 operates to intercept certain I/O writes from the I/O devices 114, 115 and, in effect, "steer" these I/O writes such that the corresponding data (hereinafter, "I/O data") is instead directly cached at a target cache of a target compute complex without requiring the reading of the I/O data from the system memory 112 before it can be operated on by a compute complex. The cache to which a particular I/O write is steered may be identified using any of a variety of parameters, such as through a steering indicator supplied by software executed at the node 101, through pre-configuration by the hardware initialization component 111 during a boot initialization process, through identification of the current "owner" of the cacheline associated with the I/O data based on coherency status information obtained from a probe filter 142 accessible by the home agent 138, or a combination thereof.

Figure 2:
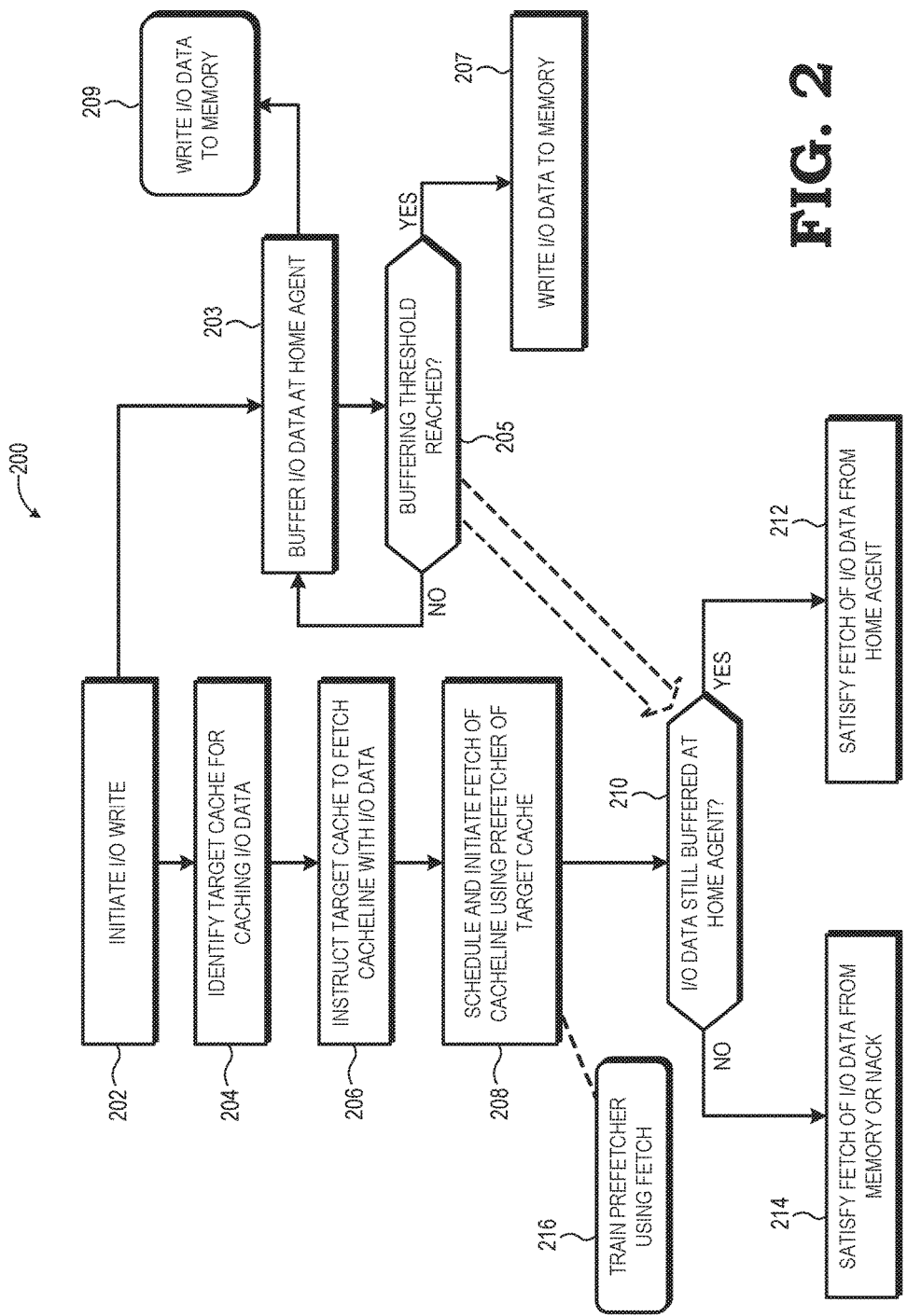
FIG. 2 is a flow diagram of a method for steering an I/O write operation in accordance with some embodiments.

FIG. 2 illustrates an example method 200 of this steered I/O write process in accordance with some embodiments. The method 200 initiates at block 202 with initiation of an I/O write operation by one of the I/O devices 114, 115 (assume I/O device 114 for purposes of illustration). To this end, the I/O device 114 submits a write transaction to the I/O hub 110, with the write transaction including the data to be provided (that is, the I/O data), a memory address (or portion thereof) associated with the I/O data, and one or more attributes to direct the processing of the write transaction. As will be explained in greater detail below, these attributes, in one embodiment, include steering information for steering the I/O data to a particular cache. The I/O hub 110 then reformats the information in the original write transaction into a format appropriate for the interconnect fabric 102 and submits the reformatted write transaction to the I/O agent 140 for further processing and transport via the transport layer 130. To illustrate, in one embodiment, the I/O devices 114, 115 and the I/O hub 110 together operate as a PCIe interconnect, and thus a write operation 144 (FIG. 1) is transmitted to the I/O hub 110 as a PCIe TLP, and the I/O hub 110 then utilizes the information in the PCIe TLP to generate and transmit a packet 146 (FIG. 1) corresponding to the protocol utilized by the transport layer 130.

The transport layer 130 transports the I/O write packet to the home agent 138. However, rather than immediately initiating a memory write access to the system memory 112 via the memory controller 108 as would be the case in a conventional I/O write, the home agent 138 instead determines to steer the I/O write to a cache of the node 101 using the techniques described herein. Accordingly, in response to receiving the I/O write packet, at block 203 the home agent 138 temporarily buffers the I/O data of the I/O write packet in a queue 148 (FIG. 1) so that the I/O data is available for subsequent access when an identified target cache attempts to fetch the I/O data, as explained below. However, because queue resources of the home agent 138 are limited, the home agent 138, in one embodiment, buffers the I/O data in view of a buffering threshold. This threshold, in some embodiments, is implemented as a specific duration, as measured by, for example, certain number of clock cycles, a certain number of fabric transactions, and the like. In other embodiments, the buffering threshold is implemented based on queue fullness, such that the I/O data remains buffered until the queue 148 is filled and the I/O data is evicted from the queue based on the queue's eviction selection criteria. As such, at block 205 the home agent 138 monitors the buffering threshold with respect to the I/O data, and once the buffering threshold is reached, at block 207 the home agent 138 evicts the I/O data from the queue 148 and, as part of this eviction process, initiates a memory access operation to transfer the I/O data to the system memory 112.

Referring again to block 203, in some embodiments the home agent 138 buffers the I/O data in place of storing the I/O data to the system memory 112. However, in some instances it may be efficient to proceed with storing the I/O data to the system memory 112 via a write operation at block 209 in addition to buffering the I/O data at the home agent 138 as described with reference to block 203. For example, if the I/O data ultimately is going to be stored to the system memory 112 after it is evicted from a local cache hierarchy 120, it often is efficient to instead store the I/O data in the system memory 112 as part of the I/O write operation at block 209 as such an I/O write operation is sequential and thus efficient for the memory controller 108.

In parallel with the I/O data buffering process represented by blocks 203, 205, 207, and 209, the home agent 138 initiates the process of steering the I/O write at block 204 by identifying a target cache for caching the I/O data. In some embodiments, the home agent 138 identifies the target cache based on a software-supplied steering indicator, whereas in other embodiments the home agent 138 identifies the target cache based on coherency information that identifies the current owner of the cacheline corresponding to the I/O data. In still other embodiments, the home agent 138 identifies the target cache based on a pre-configured steering target set during hardware initialization. Examples of these various techniques for target cache selection are described in detail below with reference to FIGS. 3 and 4.

With a target cache identified, at block 206 the home agent 138 instructs the target cache to fetch the cacheline associated with the I/O data so that the I/O data ends up cached at the target cache and available for use by the corresponding compute complex. That is, identification of a cache as the target cache serves to nominate that particular cache as the cache that is to fetch the cacheline. As described in greater detail below, the home agent 138 utilizes one or more coherency probes sent to the coherent masters of the node 101 to provide this instruction to the target cache. In some implementations, the home agent 138 leverages the invalidation probe that would be broadcast to the coherent masters as part of the I/O write to provide this instruction to the target cache, and in other embodiments the home agent 138 utilizes a direct probe to convey the instruction. These approaches are described in greater detail subsequently with reference to FIG. 5.

At block 208, the target cache receives the instruction to possibly invalidate and fetch the cacheline associated with the I/O data, and in response, schedules a prefetcher (e.g., prefetcher 150, FIG. 1) implemented by the target cache to implement the fetch operation. When the prefetcher reaches the fetch operation in its schedule of cache fetch operations, the prefetcher issues a normal fetch operation, which is transported to the home agent 138 via the coherent agent associated with the compute complex having the target cache as though to trigger a memory access operation to access the corresponding cacheline from the system memory 112.

As noted with respect to block 201, the home agent 138 temporarily buffers the I/O data at the local queue 148. Accordingly, in response to receiving the cache probe for the cacheline, at block 210 the home agent 138 determines whether the I/O data is still buffered in the local queue 148. If so, at block 212 the home agent 138 satisfies the fetch operation by forwarding to the prefetcher a copy of the buffered I/O data as the cacheline requested by the prefetcher. As is consistent with typical coherency policies, if the I/O data has already been stored to the system memory 112 as described at block 207, then the copy of the buffered data is provided as a clean cacheline copy, thus indicating no need to write back the I/O data to system memory 112 if it is unmodified. Otherwise, if the I/O data has not yet been stored to system memory 112, the buffered I/O data is provided to the prefetcher as a dirty cacheline copy, thereby indicating that the I/O data will need to be stored to system memory 112 upon cache eviction regardless of whether it has been modified.

In some situations, the prefetcher of the target cache may be relatively late in initiating the fetch operation due to any of a variety of factors, such as a relatively large number of higher-priority fetch operations in the scheduling queue ahead of the fetch operation. Thus, returning to block 210, if the home agent 138 no longer is buffering the I/O data by the time the cache probe for the fetch operation is received, the home agent 138 is no longer able to satisfy the fetch operation with a local copy of the I/O data. Accordingly, in some embodiments, at block 214 the home agent 138 signals the memory controller 108 to initiate a memory access operation to access from the system memory 112 a copy of the I/O data that was stored to the system memory 112 at block 205 so as to satisfy the fetch operation requested by the prefetcher of the target cache. In other embodiments, rather than initiate a memory access operation, at block 214 the home agent 138 instead identifies this missed fetch as such and negatively acknowledges (NACKs) the request.

In addition to avoiding two sequential memory access operations in order to cache I/O data for access by a compute complex, as represented by block 216, in some embodiments the steering process described above is used to train or tune prefetchers; that is, the fetch operation itself is used by the prefetcher for stride detection or other prefetch patterns that then may be used by the prefetcher to anticipate the data potentially to be used by the compute complex and prefetch the data accordingly.

Figure 3:
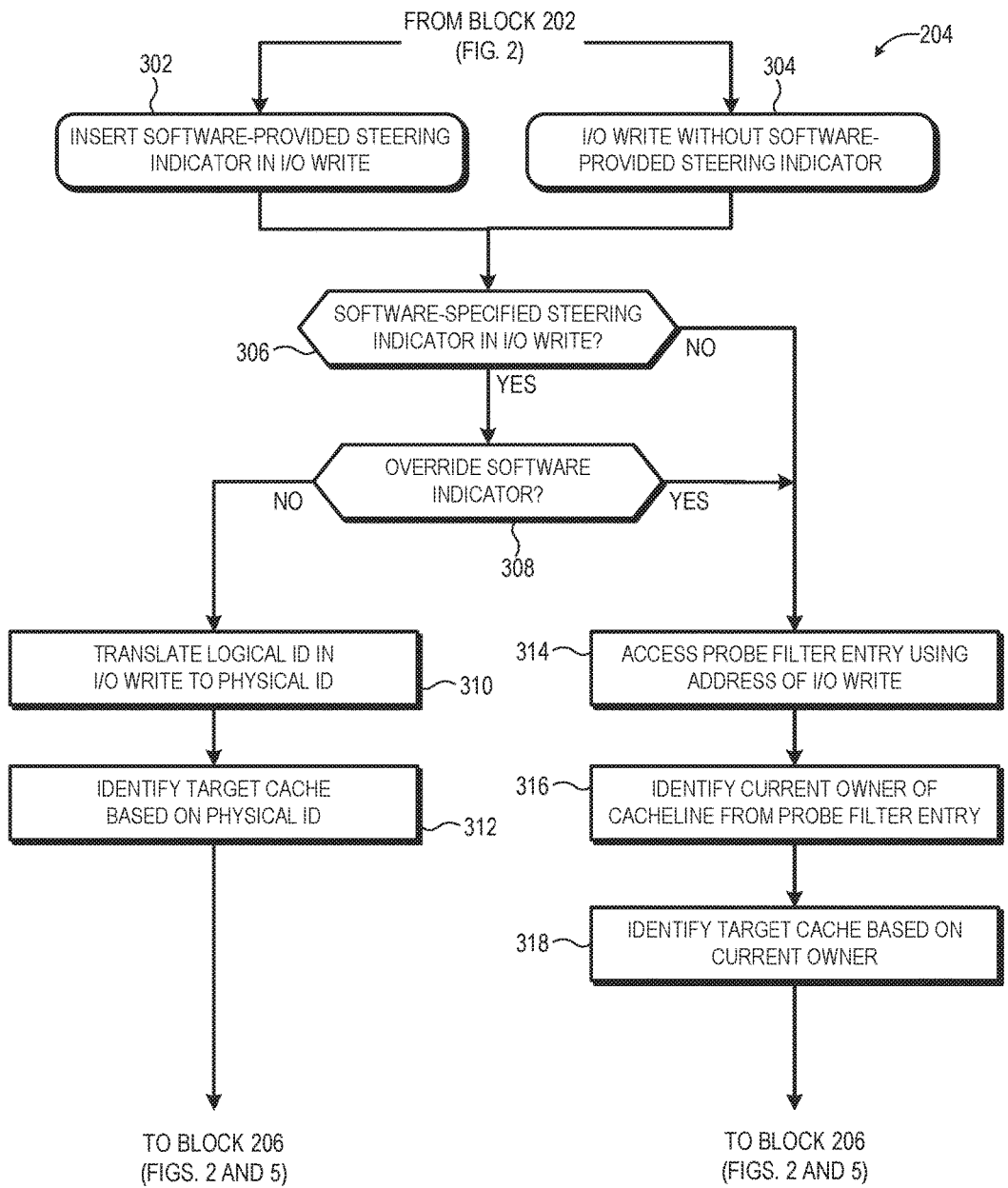
FIG. 3 is a flow diagram illustrating an example target cache identification process for the method of FIG. 2 in accordance with some embodiments.
Figure 4:
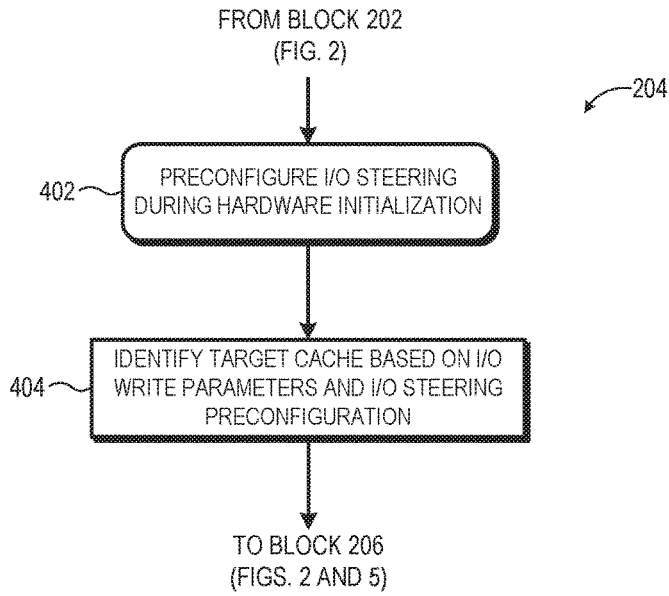
FIG. 4 is a flow diagram illustrating another example target cache identification process for the method of FIG. 2 in accordance with some embodiments.

FIGS. 3 and 4 illustrate example implementations of the process for the home agent 138 to identify the target cache for a I/O write as represented at block 204 of method 200 of FIG. 2. Turning to FIG. 3, the illustrated process represents an embodiment in which the target cache may be identified via software or via identification of the current "owner" of the corresponding cacheline using the coherency information in a probe filter. Accordingly, as represented by blocks 302 and 304, the I/O write may be configured in different ways depending on whether the processing system 100 is configured to support software-indicated I/O data steering. Block 302 represents a mode in which software provides a hint or a specific instruction to the interconnect fabric 102 for steering an I/O write operation. In particular, in some embodiments a software application or device driver of the I/O device 114 is configured to insert a software-provided steering indicator into the packet representing the I/O write operation submitted to the I/O hub 110. As noted above, in some implementations the I/O device 114 operates in accordance with a PCIe specification and thus submits the I/O write as a PCIe TLP to the I/O hub. The PCIe specification provides that a TLP may include a TLP processing hint (TPH). Accordingly, software may program a TPH-supporting I/O device to generate I/O writes whereby the TLPs representing the I/O writes contain a Steering Tag (ST)

encoded to represent an identifier (ID) associate with the compute complex or specific cache to which the I/O data is to be steered. The ID used for the steering tag can include, for example, the APIC ID of the compute complex or cache to which the I/O data is being steered.

Block 304 represents an alternative mode whereby a software-provided steering indicator is not provided with the I/O write operation. For example, the I/O device 114 or its software driver may not be configured to provide steering hints in this manner, or the I/O device may be ambivalent as to which particular cache or compute complex serves as the target cache for the I/O data. Accordingly, in such instances, the I/O write operation does not include a software-provided steering indicator.

In at least one embodiment, the interconnect fabric 102 is adaptable so as to handle I/O write operations with software-indicated steering as well as I/O write operations without software-indicated steering. Accordingly, in response to receiving the packet representing an I/O write operation, at block 306 the home agent 138 analyzes the packet to determine whether a software-provided steering indicator is present, such as by evaluating the two-bit field in the TPH field of the TLP as described above. If a software-provided steering indicator is present, then at block 308 the home agent 138 determines whether to override the software-based steering indicator in favor of a target cache determined on the basis of coherency information. The home agent 138 may consider a variety of factors in whether to override the software-based steering indicator. For example, the TPH may include an attribute that specifies whether the software-based steering indicator can be ignored or overridden. Alternatively, the home agent 138 may be configured by the hardware initialization component 111 to override the software-based steering indicators, either as a blanket instruction or on a case-by-case basis (e.g., based on the I/O device, the priority of the I/O write operation, and the like).

In the event that the home agent 138 decides to honor the software-based steering indicator, the home agent 138 proceeds with identification of the target cache based on the software-based steering indicator. In some embodiments, the software-based steering indicator identifies a logical identifier (ID) of a target compute complex or target cache. For example, the software providing the steering indicator may not be aware of the physical IDs of the devices within the system 100, but rather has only knowledge of the logical ID of its intended target cache or target compute complex. In such implementations, at block 310 the home agent 138 accesses an ID translation table 154 (FIG. 1)(e.g., a look-up table, or LUT) containing logical-to-physical ID translations for the system 100 so as to translate the logical ID of the steering indicator to a corresponding physical ID. To illustrate, the software may have knowledge of the Advanced Programmable Interrupt Controller (APIC) IDs of the components of the system 100, and thus provide the APIC ID of its intended target cache or compute complex as the steering tag in the TPH field of the TLP, and the ID translation table 154 of the home agent 138 includes translations of APIC IDs to corresponding HyperTransport-based or Infinity Fabric-based physical core IDs.

With the physical ID obtained, at block 312 the home agent 138 identifies the target cache based on the physical ID. In some instances, the software-based steering indicator specifies an ID for a particular cache in a particular compute complex, and in such cases the physical ID directly identifies the target cache. However, in other instances the software may not have visibility into the particular caching arrangement of the compute complex, and thus uses a steering indicator that merely specifies a particular compute complex without identifying a particular cache within that compute complex. In such instances, the home agent 138 may be configured to select a particular cache within the compute complex by default (e.g., by always nominating the L3 cache within a compute complex as the target cache), or may select a particular cache based on one or more parameters, such as data priority, data type, write type, and the like. With the target cache so identified, the flow proceeds to instruction of the target cache to fetch the cacheline containing the I/O data (block 206), an example implementation of which is described in greater detail below with reference to FIG. 5.

Returning to blocks 306 and 308, if the I/O write does not contain a software-provided steering indicator, or if software-steering is overridden, in some embodiments the system 100 may use an address-based steering in which the address of an I/O write is used to select a particular home agent 138 associated with the address range into which the address falls, and then that home agent 138 by default steers the I/O write into a compute complex in the same node as the home agent 138. In other embodiments, however, the home agent 138 turns to using coherency information for the cacheline containing the I/O data to nominate a target cache. As will be appreciated, probe filters or other cache coherence directories, such as the probe filter 142, are used in processing systems to maintain coherency information for cachelines present in the cache hierarchies of the system, including which cache(s) currently have a copy of which cachelines, and in what coherency state. This coherency information thus may be interpreted to identify which cache is the current "owner" of the cacheline. Accordingly, at block 314, the home agent 138 accesses the probe filter 142 using an address portion representing the cacheline containing the I/O data to access the corresponding entry for the cacheline from the probe filter 142. At block 316, the home agent 138 uses the coherency information stored in the accessed entry to identify the cache best construed as the current "owner" of the cacheline. To illustrate, if the system 100 utilizes, for example, a MOESIF coherency protocol, or variant thereof, the home agent 138 may identify the current owner of the cacheline in descending priority: (1) the cache that is currently caching the cacheline in the Exclusive or Dirty state; (2) the cache that is currently caching the cacheline in the Owned state; (3) the cache that is currently caching the cacheline in the Forward state; or (4) if the cacheline is shared, the last cache to request the cacheline. When the current owner of the cacheline is identified, at block 318 the home agent 138 nominates or selects this current owner as the target cache for steering the I/O write operation. With the target cache identified, the flow proceeds to instruct the target cache to fetch the cacheline containing the I/O data (block 206), as described in greater detail below with reference to FIG. 5.

Turning now to FIG. 4, an alternate embodiment of the target cache identification process (block 204) is illustrated. In this embodiment, rather than using software-provided steering indicators or coherency information, the home agent 138 may be pre-configured to steer certain I/O writes to certain target caches. Accordingly, during boot up or other initialization of the processing system 100, the hardware initialization component 111 configures the interconnect fabric 102, and more particularly, the home agent 138, to use cache steering to a specific cache for I/O writes having one or more specified attributes at block 402. As an example, the hardware initialization component 111 programs the home agent 138 based on the I/O device issuing the I/O write, so as to steer I/O writes from the I/O device 114 to the L3 cache 126 of the compute complex 104, and to steer I/O writes from the I/O device 115 to the L2 cache 124 of the compute complex 105. Other attributes that the home agent 138 may be pre-configured to steer for include the particular bus upon which the I/O write is received, the data type or function associated with the I/O write, the priority of the I/O write, and the like. This preconfiguration is implemented using, for example, a steering configuration table 156 (FIG. 1) at the home agent 138, which includes entries that match certain I/O write attributes to the physical IDs of corresponding target caches.

With the home agent 138 preconfigured, when a packet representing an I/O write is received at the home agent 138 at block 404, the home agent 138 determines the one or more relevant parameters of the I/O write and performs a lookup into the steering configuration table 156 based on the determined parameters to identify the physical ID of the target cache. With the target cache identified, flow proceeds to instruct the target cache to fetch the cacheline containing the I/O data (block 206).

Figure 5:
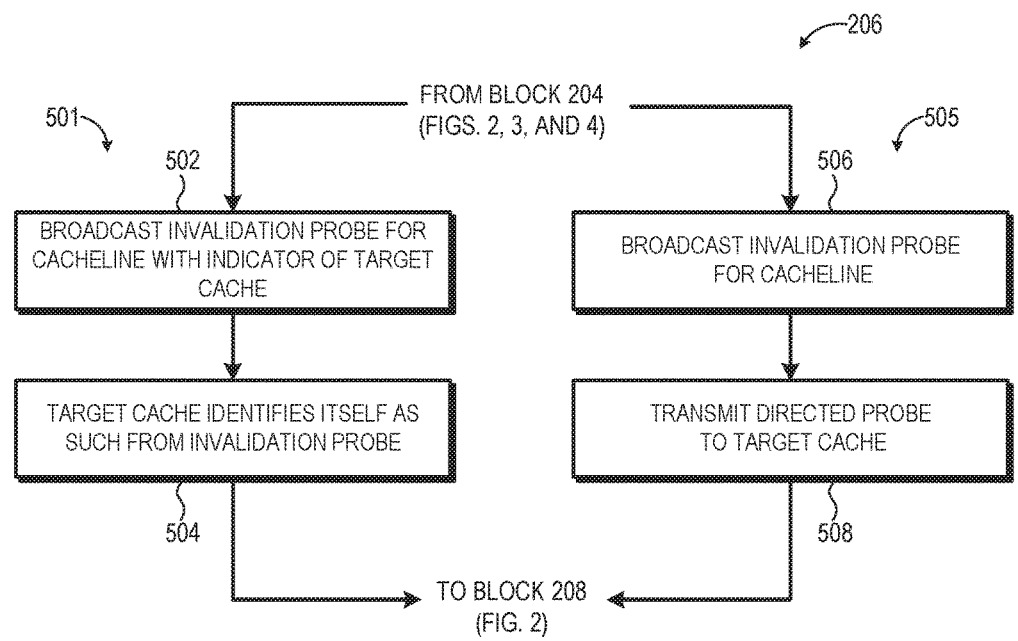
FIG. 5 is a flow diagram illustrating an example target cache instruction process for the method of FIG. 2 in accordance with some embodiments.

FIG. 5 illustrates an example embodiment of the target cache instruction process represented by block 206 of the method 200 of FIG. 2. In this implementation, the home agent 138 leverages the probe messaging functionality implemented by coherent slaves (including the home agent 138) of the interconnect fabric 102 to signal coherency events to the coherent masters (including the compute complexes 104, 105) of the interconnect fabric 102. This process may take at least two approaches. In a first approach, as represented by flow 501 in FIG. 5, the home agent 138 leverages the invalidation probe that is broadcast when an I/O write operation is conducted. That is, because an I/O write is introducing "new" I/O data into the memory hierarchy of the node 101, any "old" copies of the same cacheline containing the I/O data will need to be invalidated, and this is conventionally achieved by the home agent 138 broadcasting an invalidation probe for the cacheline to the coherent masters in the node 101. However, for the steering process, at block 502 the home agent 138 modifies this invalidation probe to include an indicator of the target cache selected at block 204 and broadcasts the modified invalidation probe (e.g., invalidation probe 158, FIG. 1) to the coherent masters via their corresponding coherent agents of the interconnect fabric 102. To illustrate, in an Infinity Fabric-based implementation, rather than broadcasting a PrbInvalidate packet as is conventionally used for an I/O write, the home agent 138 instead broadcasts a Prb Store packet that is a combination of a PrbInvalidate probe and an instruction to interpret one or more fields of the probe to trigger the target cache (indicated via, for example, a physical ID of the target cache) to fetch the cacheline because the cacheline is being invalidated on behalf of an I/O write.

At block 504, each of the caches, as a coherent master, receives the broadcast modified invalidation probe and analyzes the contents of the probe. As part of this analysis, each cache compares its physical ID to the physical ID represented in the probe. If the physical IDs match at a cache, the cache identifies itself as the target cache for steering the I/O write, and, in response, schedules the fetch operation for the cacheline identified in the invalidation probe for execution by its prefetcher, as described above.

In still other embodiments, if the node 101 does not employ a probe filter and thus does not identify a target cache from coherency information, then the home agent 138 broadcasts the invalidation probe with a special encoding (e.g., "111111") that signals to all receiving caches to determine whether the receiving cache currently has the line in a particular coherency state indicating the cache has current "ownership" (e.g., Exclusive, Modified, Owned, Forward), and if so, the cache schedules a fetch operation for the cacheline in response.

In a second approach, represented by flow 505, rather than leverage the broadcast invalidation probe as a target cache nominator, at block 506 the home agent 138 broadcasts a conventional invalidation probe, and then at block 508 the home agent 138 transmits a directed probe specifically to the target cache with attributes or an encoding that instruct the target cache to schedule a fetch operation at its prefetcher, as described above.

In some embodiments, the apparatus and techniques described above are implemented in a system including one or more integrated circuit (IC) devices (also referred to as integrated circuit packages or microchips), such as the system 100 described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims be low. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system, comprising:
a plurality of compute complexes, each compute complex comprising:
at least one processing core; and
a local cache hierarchy comprising at least one cache; and
an interconnect fabric comprising:
a transport layer;
a first coherency agent coupled to the transport layer and coupleable to a system memory and an input/output (I/O) device; and
a second coherency agent coupled to the transport layer and coupleable to the I/O device; and
wherein, in response to an I/O write operation for data from the I/O device, the first coherency agent is configured to:
identify a cache of one of the plurality of compute complexes as a target cache based on at least one of: a software-provided steering indicator, a steering configuration implemented at boot initialization, and coherency information for a cacheline associated with the data; and
signal the identified target cache to cache the data from the I/O write operation.

2. The processing system of claim 1, wherein:
the first coherency agent is configured to identify the target cache based on the software-provided steering indicator.

3. The processing system of claim 2, wherein the software-provided steering indicator is included in a packet having the data transmitted from the second coherency agent to the first coherency agent.

4. The processing system of claim 3, wherein:
the packet comprises a Peripheral Component Interconnect (PCI) Express Transaction Layer Packet (TLP); and
the software-provided steering indicator comprises a value stored to a specified field of the TLP.

5. The processing system of claim 3, wherein:
the software-provided steering indicator comprises a logical identifier; and
the first coherency agent is configured to:
access a translation table to translate the logical identifier to a physical identifier; and
identify the target cache based on the physical identifier.

6. The processing system of claim 1, wherein:
the first coherency agent is configured to identify the target cache based on the coherency information for the cacheline associated with the data.

7. The processing system of claim 6, further comprising:
a probe filter having a plurality of entries, each entry configured to store coherency information for a corresponding cacheline, the stored coherency information comprising a coherency status for the cacheline for each of one or more caches of the processing system; and
wherein the first coherency agent is configured to:
access the probe filter to obtain the coherency information for the cacheline associated with the data and to determine a current owner of the cacheline based on one or more coherency statuses represented by the coherency information; and
identify the current owner of the cacheline as the target cache.

8. The processing system of claim 1, wherein:
the first coherency agent is configured to identify the target cache based on the steering configuration implemented at boot initialization; and
the processing system further comprises:
a hardware initialization component to configure the first coherency agent with the steering configuration to identify a specific cache of the processing system as the target cache for I/O write operations by the I/O device based on one or more parameters of the I/O write operations.

9. The processing system of claim 1, wherein:
the target cache is configured to schedule a prefetcher to fetch the cacheline associated with the data.

10. The processing system of claim 9, wherein:
the first coherency agent is configured to direct the identified target cache to cache the data by broadcasting an invalidation probe to the caches of the plurality of compute complexes, the invalidation probe including an identifier associated with the target cache; and
the target cache is configured to schedule the prefetcher to fetch the cacheline responsive to receiving the invalidation probe.

11. The processing system of claim 9, wherein:
the first coherency agent is configured to temporarily buffer the data.

12. The processing system of claim 11, wherein:
responsive to the prefetcher initiating the fetch of the cacheline while the data is still buffered at the first coherency agent, the first coherency agent is configured to provide the buffered data to the prefetcher; and
responsive to the prefetcher initiating the fetch of the cacheline after the data is no longer buffered at the first coherency agent, the first coherency agent is configured to initiate a memory access operation to access the data from the system memory for the prefetcher.

13. The processing system of claim 9, wherein:
the prefetcher is configured to train at least one prefetching algorithm based on the fetch of the cacheline.

14. A method for steering data for an input/output (I/O) write operation in a processing system, the method comprising:
in response to receiving the I/O write operation:
identifying, at an interconnect fabric, a cache of one of a plurality of compute complexes of the processing system as a target cache for steering the data based on at least one of: a software-provided steering indicator, a steering configuration implemented at boot initialization, and coherency information for a cacheline associated with the data; and
directing, via the interconnect fabric, the identified target cache to cache the data from the I/O write operation.

15. The method of claim 14, wherein:
identifying a cache of one of a plurality of compute complexes as the target cache comprises identifying the cache as the target cache based on the software-provided steering indicator.

16. The method of claim 15, wherein:
the software-provided steering indicator is included in a packet having the data that is transmitted by the interconnect fabric.

17. The method of claim 16, wherein:
the software-provided steering indicator comprises a logical identifier; and
identifying the cache as the target cache based on the software-provided steering indicator comprises:
accessing a translation table to translate the logical identifier to a physical identifier; and
identifying the target cache based on the physical identifier.

18. The method of claim 14, wherein:
identifying a cache of one of a plurality of compute complexes as the target cache comprises identifying the cache as the target cache based on the coherency information for the cacheline associated with the data.

19. The method of claim 18, further comprising:
accessing a probe filter to obtain the coherency information for the cacheline associated with the data;
determining a current owner of the cacheline based on one or more coherency statuses represented by the coherency information; and
identifying the current owner of the cacheline as the target cache.

20. The method of claim 14, wherein:
identifying a cache of one of a plurality of compute complexes as the target cache comprises identifying the cache as the target cache based on the steering configuration implemented at boot initialization; and
the method further comprises:
configuring the interconnect fabric with the steering configuration to identify a specific cache of the processing system as the target cache for I/O write operations based on one or more parameters of the I/O write operations.

21. The method of claim 14, wherein:
directing the identified target cache to cache the data from the I/O write operation comprises scheduling, at a prefetcher of the target cache, a fetch operation to fetch the cacheline associated with the data.

22. The method of claim 21, wherein:
directing the identified target cache to cache the data further comprises broadcasting an invalidation probe to the caches of the plurality of compute complexes, the invalidation probe including an identifier associated with the target cache; and
scheduling the fetch operation at the prefetcher responsive to receiving the invalidation probe at the target cache.

23. The method of claim 21, further comprising:
temporarily buffering the data at the interconnect fabric.

24. The method of claim 23, further comprising:
responsive to the prefetcher initiating the fetch of the cacheline while the data is still buffered at the interconnect fabric, providing the buffered data from the interconnect fabric to the prefetcher; and
responsive to the prefetcher initiating the fetch of the cacheline after the data is no longer buffered at the interconnect fabric, initiating a memory access operation to access the data from system memory for the prefetcher.

25. The method of claim 21, further comprising:
training the prefetcher based on the fetch of the cacheline.

* * * * *